United States Patent
Collodo et al.

(10) Patent No.: US 12,437,223 B2
(45) Date of Patent: Oct. 7, 2025

(54) PHASE-ACCURATE GENERATION OF QUANTUM-COMPUTING CONTROL SIGNALS

(71) Applicant: ZURICH INSTRUMENTS AG, Zürich (CH)

(72) Inventors: Michele Collodo, Zürich (CH); Flavio Heer, Lufingen (CH)

(73) Assignee: ZURICH INSTRUMENTS AG, Zurich (CH)

( * ) Notice: Subject to any disclaimer, the term of this patent is extended or adjusted under 35 U.S.C. 154(b) by 0 days.

(21) Appl. No.: 18/707,715

(22) PCT Filed: Dec. 15, 2021

(86) PCT No.: PCT/EP2021/085865
§ 371 (c)(1),
(2) Date: May 6, 2024

(87) PCT Pub. No.: WO2023/110072
PCT Pub. Date: Jun. 22, 2023

(65) Prior Publication Data
US 2025/0094852 A1    Mar. 20, 2025

(51) Int. Cl.
G06N 10/40     (2022.01)
H03K 3/01      (2006.01)
H03M 1/12      (2006.01)

(52) U.S. Cl.
CPC ............. *G06N 10/40* (2022.01); *H03K 3/01* (2013.01); *H03M 1/12* (2013.01)

(58) Field of Classification Search
CPC .. H03K 3/00; H03K 3/01; H03K 3/02; H03K 19/00; H03K 19/02; H03K 19/195; G06F 1/022; G06F 1/0321; G06N 10/40
USPC .................. 327/100, 107, 113, 119, 120, 129
See application file for complete search history.

(56) References Cited

U.S. PATENT DOCUMENTS 4,222,108 A    9/1980   Braaten
8,324,897 B2   12/2012  Hornung
(Continued)

FOREIGN PATENT DOCUMENTS

| EP | 3 226 350 | 10/2017 |
|----|-----------|---------|
| EP | 3 836 039 | 6/2021 |
| GB | 2 430 320 | 3/2007 |
| WO | 2008/095745 | 8/2008 |

OTHER PUBLICATIONS

Arute et al., "Quantum supremacy using a programmable superconducting processor", Nature, vol. 574, Internet: https://doi.org/10.1038/s41586-019-1666-5, Oct. 23, 2019, pp. 505-511.
(Continued)

*Primary Examiner* — Hai L Nguyen
(74) *Attorney, Agent, or Firm* — GREENBLUM & BERNSTEIN, P.L.C.

(57) ABSTRACT

Method and waveform generator for generating at least two signals. The signals are generated by separate channels, with each channel having a numerically controlled oscillator and a digital envelope generator, whose outputs are multiplied and fed to a digital-analog converter. The signal from the digital-analog converter is multiplied with the signal from a local oscillator for generating pulses with an up-converted carrier. The phases of the numerically controlled oscillators are changed between pulses in order to adjust the phase of the up-converted carrier. This allows to generate pulses where the up-converted carriers have a defined phase relationship.

22 Claims, 4 Drawing Sheets

(56) References Cited

U.S. PATENT DOCUMENTS

| | | | |
|---|---|---|---|
| 11,726,790 B2* | 8/2023 | Khammassi | G06F 7/5443 |
| | | | 706/62 |
| 2009/0167375 A1 | 7/2009 | Mki et al. | |
| 2016/0219544 A1 | 7/2016 | Park | |
| 2021/0182071 A1 | 6/2021 | Khammassi | |
| 2021/0341979 A1 | 11/2021 | Chakraborty et al. | |
| 2023/0280780 A1* | 9/2023 | Dütsch | G06F 1/0321 |
| | | | 708/272 |

OTHER PUBLICATIONS

Ball et al., "The role of master clock stability in quantum information processing", npj Quantum Information (2016) 2, 16033; doi:10.1038/npjqi.2016.33; published online Nov. 8, 2016.

Foxen et al., "Demonstrating a Continuous Set of Two-Qubit Gates for Near-Term Quantum Algorithms", Physical Review Letters 125, 120504 (2020), Sep. 15, 2020, pp. 120504-1-120504-6.

"Supplementary information for Quantum supremacy using a programmable superconducting processor", Google AI Quantum and collaborators, Jan. 1, 2020, pp. 1-67.

"IQ, Image Reject & single sideband Mixer Primer", 2018 Marki Microwave, Inc, Internet: https://markimicrowave.com/, ., pp. 3-19.

McKay et al., "A universal gate for fixed-frequency qubits via a tunable bus", IBM T.J. Watson Research Center, Dec. 20, 2016, pp. 1-10.

Salathé et al., "Digital Quantum Simulation of Spin Models with Circuit Quantum Electrodynamics", Physical Review X 5, 021027, Jun. 17, 2015, pp. 021027-1-021027-12.

Int'l Search Report (form PCT/ISA/210) conducted in Int'l Appln. No. PCT/EP2021/085865 (Sep. 6, 2022).

Int'l Written Opinion (form PCT/isa/237) conducted in Int'l Appln. No. PCT/EP2021/085865 (Sep. 6, 2022).

* cited by examiner

PHASE-ACCURATE GENERATION OF QUANTUM-COMPUTING CONTROL SIGNALS

TECHNICAL FIELD

The invention relates to a method for generating phase-controlled signals by means of a signal generator as well as to a signal generator implementing this method. This type of signals can e.g. be used for controlling the qubits of a quantum processor.

BACKGROUND ART

In various applications, there is a need to generate pulses having several high-frequency carriers modulated into series of pulses. The pulses have to be generated at certain times. In addition, the carriers need to have a defined phase relative to each other and/or relative to the pulses.

For example, some quantum processing gates, such as SWAP gates, need a consistent phase alignment between the qubits and the signals from the qubit drive. Ideally, each experiment is run with exactly the same starting conditions, including a perfect alignment of all phases. In addition, a gate operation on a qubit is advantageously started at the same starting conditions for different prior operations.

Salathé et al. in Phys. Rev. X 5, 021027 (2015) e.g. achieve this by fixing the qubit detuning to 200 MHz and choosing a corresponding commensurate repetition rate.

However, choosing repetition rates (i.e. pulse times) commensurate with the used frequencies imposes undesirable limits on frequencies and timing. The problem is particularly acute for signals using high-frequency carriers in the GHz range because such signals cannot be generated easily by a digital waveform generator alone but advantageously use high-frequency local oscillators and up-conversion, and it is challenging to control the phase of such high-frequency local oscillators.

DISCLOSURE OF THE INVENTION

Hence, the problem to be solved by the present invention is to provide a method and signal generator of the type mentioned above that allow to easily generate phase-accurate pulses. This problem is solved by the independent claims.

Hence, the invention provides a method for generating at least two signals $S_k$ with $k=1 \ldots K$ by means of a signal generator. The signal generator comprises a first channel k' and a second channel k". Each channel k has at least the following elements:

A digital section: This is a section comprising digital circuitry and processing signals numerically. It is adapted to generate a digital signal set of at least one digital signal having an (angular) frequency $\omega_{NCOk}$. The digital signal set further encodes digital phase information indicative of a phase shift $\varphi_k$. This phase shift may e.g. be encoded directly as a phase shift in the digital signal or, if there are several, mutually phase-shifted digital signals, it may also be encoded in their relative amplitudes (IQ-modulation) as explained in more detail below.

A digital-analog converter (DAC) connected to the multiplier: The DAC converts the digital signal set into an analog signal set comprising at least one analog signal having a frequency $\omega_{NCOk}$. The analog signal set still encodes the information indicative of the phase shift $\varphi_k$.

An up-converter: The up-converter comprises a local oscillator adapted to generate an analog oscillator signal at a frequency $\omega_{LOk}$ and a mixer adapted to generate an up-converted signal from the analog oscillator signal and the analog signal set. The up-converted signal has a frequency of $\omega_{LOk} \pm \omega_{NCOk}$ with the phase shift $\varphi_k$. The frequency may therefore be $\omega_{LOk} + \omega_{NCOk}$ or it may be $\omega_{LOk} - \omega_{NCOk}$ or the up-converted signal may include components at both frequencies.

Advantageously, the local oscillator is implemented in analog circuitry.

The local oscillator advantageously a high frequency, in particular an (angular) frequency $\omega_{LOk} > 2\pi \cdot 2$ GHz.

The method comprises at least the following steps:

Generating, at a time $t_0$, a first pulse with the first channel k' and a first pulse with the second channel k". The two pulses may or may not have the same envelope, but they advantageously, but not necessarily, overlap at least at time $t_0$.

Generating, at a time $t_1$, a second pulse with the first channel k' and a second pulse with the second channel k": Again, the two pulses may or may not have the same envelope, but they advantageously overlap at least at time $t_1$ Operating, during both times $t_0$ and $t_1$, and in particular also at any time between $t_0$ and $t_1$,
the local oscillator of the first channel k' at a frequency $\omega_{LOk'}$, the local oscillator of the second channel k" at a frequency $\omega_{LOk''}$,
the numerically controlled oscillator of the first channel at a frequency $\omega_{NCOk'}$,
the numerically controlled oscillator of the second channel at a frequency $\omega_{NCOk''}$.

As mentioned above, this generates up-converted signals having the carrier frequencies $\omega_{LOk'} + \omega_{NCOk'}$ and $\omega_{LOk''} + \omega_{NCOk''}$, respectively.

Operating the digital sections of both channels at the times $t_0$ and $t_1$ to generate pulse envelopes for the pulses: In other words, the digital sections provide the envelopes of the pulses.

Changing, between the times $t_0$ and $t_1$, at least one of
the phase shift $\varphi_{k'}$ of the first channel and
the phase shift $\varphi_{k''}$ of the second channel,
while maintaining the condition $$(\varphi_{k''1} - \varphi_{k''0} - \varphi_{k'1} + \varphi_{k'0}) \mod 2\pi =$$
$$((\omega_{NCOk'} + \omega_{LOk'} - \omega_{NCOk''} - \omega_{LOk''}) \cdot (t_1 - t_0)) \mod 2\pi,$$

with $\varphi_{k'0}$ and $\varphi_{k'1}$ being the phase shifts of the signal of the first channel at the times $t_0$ and $t_1$, respectively and $\varphi_{k''0}$ and $\varphi_{k''1}$ being the phase shifts of the signal of the second channel at the times $t_0$ and $t_1$, respectively. Changing the phase shift of at least one of the digital sections between the times $t_0$ and $t_1$ allows to control the phase shift of the up-converted carrier at these times, thereby providing fine-grained phase control without the need to use a timing commensurate with the frequencies or to reset the phases of the local oscillators. As shown below, meeting the above condition results in the first and second carrier having the same relative phase at the times $t_0$ and $t_1$.

Note: As known to the skilled person, up-conversion may generate two sidebands sidebands, i.e., for a given channel k, in the upper sideband at $\omega_{LOk}+\omega_{NCOk}$ and the lower sideband $\omega_{LOk}-\theta_{NCOk}$ (if both frequencies are assumed to be positive numbers). In order to cover both cases while keeping the formulations simple, the chosen sideband is expressed in the sign of the frequency $\omega_{NCOk}$. If, for a given channel k:

the upper sideband is used, $\omega_{NCOk}$ is a positive number and the lower sideband is used, $\omega_{NCOk}$ is a negative number. In both cases, the absolute value of $\omega_{NCOk}$ is the angular frequency of the numerically controlled oscillator.

In a particularly advantageous embodiment, for both channels k' and k", the phase shifts fulfil the following, more stringent condition:

$$(\varphi_{k0} - \varphi_{k1}) \bmod 2\pi = ((\omega_{NCOk} + \omega_{LOk}) \cdot (t_1 - t_0)) \bmod 2\pi,$$

for both k=k' and k=k".

As shown below, meeting this condition not only maintains the phase relation between the carriers at the times $t_0$ and $t_1$, but it also ensures that each carrier has the same phase at the times $t_0$ and $t_1$. This results in the two pulses of a given channel having exactly the same shape if their envelopes are equal at the times $t_0$ and $t_1$.

In another embodiment, the phase shifts for the first channel k' fulfill the condition $$\varphi_{k'1} - \varphi_{k'0} = 0.$$

And, at the same time, the phase shifts for the second channel k" fulfill the condition $$(\varphi_{k''1} - \varphi_{k''0}) \bmod 2\pi =$$

$$((\omega_{NCOk'} + \omega_{LOk'} - \omega_{NCOk''} - \omega_{LOk''}) \cdot (t_1 - t_0)) \bmod 2\pi.$$

In this case, the carrier of the first channel sees no additional phase shift between the times $t_0$ and $t_1$, yet, as explained below, an additional phase shift is added to the carrier of the second channel in order to make sure that the phase shift between the carriers of the first and second channels is the same at time $t_0$ as the phase shift between the carriers of the first and second channels at time $t_1$.

Advantageously, the digital section of one or both channels comprises:

A numerically controlled oscillator (NCO): In this context, a "numerically controlled" oscillator is a digital circuit that generates an oscillating time series of values having a frequency $\omega_{NCOk}$. The frequency can be controlled numerically.

A digital envelope generator: This is a digital circuit that generates another time series of values, e.g. from a lookup table. It is used to generate the pulse envelopes. It may be common to all channels k or at least some of the channels may have their own digital signal generator.

A digital multiplier connected to the digital signal generator and the numerically controlled oscillator: The multiplier multiplies the values from the signal generator and the NCO, i.e. it modulates the NCO signal with the envelope provided by the digital signal generator.

In this case, the digital signal(s) can be generated using digital envelope data and the NCO settings, obviating the need to e.g. tabulate individual points of an oscillating signal in a memory.

In this case, the NCO is advantageously adapted to generate the digital oscillator signal with the phase shift $\varphi_k$. This allows to directly add the phase shift $\varphi_k$ to the digital oscillator signal and therefore to the digital signal(s) generated by the digital multiplier. In this case, the method may comprise the step of setting the phase shift $\varphi_k$ of the NCO to fulfill the condition above.

In another approach, adapted to use an IQ up-conversion scheme, the digital section is adapted to generate, as part of the digital signal set, at least a first digital signal and a second digital signal. The first and second digital signals are mutually phase-shifted (by a value not equal to an integer multiple of 180°). In this case, the phase shift of the up-converted signal may be changed by suitably setting the ratio of the amplitudes of the first and second digital signals. In other words, the phase shift $\varphi_k$ can be encoded in the relative amplitudes of the two digital signals.

Advantageously, in this case, the method comprises the step of setting a ratio of the amplitudes of the first and the second digital signal as a function of the phase shift $\varphi_k$, e.g. as given in Eqs. (16) or (16') below.

In particular the first and the second digital signal can have a mutual phase shift of 90°, which corresponds to the technique used in classic IQ-up-conversion.

The invention also relates to a signal generator for carrying out the method of any of the preceding claims. The signal generator comprises, as mentioned above, at least said first channel k' and said second channel k", with each channel k having a digital section adapted to generate a digital signal set comprising at least one digital signal having a frequency $\omega_{NCOk}$, wherein the digital signal set encodes digital phase information indicative of a phase shift $\varphi_k$, at least one digital-analog converter adapted to convert the digital signal set into an analog signal set comprising at least one analog signal having a frequency $\omega_{NCOk}$, wherein the analog signal set encodes the information indicative of the phase shift $\varphi_k$, an up-converter comprising a local oscillator adapted to generate an analog oscillator signal at a frequency $\omega_{LOk}$ and a mixer adapted to generate an up-converted signal from the analog oscillator signal and the analog signal set, wherein the up-converted signal has a frequency of $\omega_{LOk} \pm \omega_{NCOk}$ with the phase shift $\varphi_k$.

The signal generator further comprises a sequencer control unit adapted to carry out the steps of the method of the invention.

The invention also relates to the application of this method and signal generator for controlling at least one qubit, in particular at least two qubits.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Overview

Figure 1:
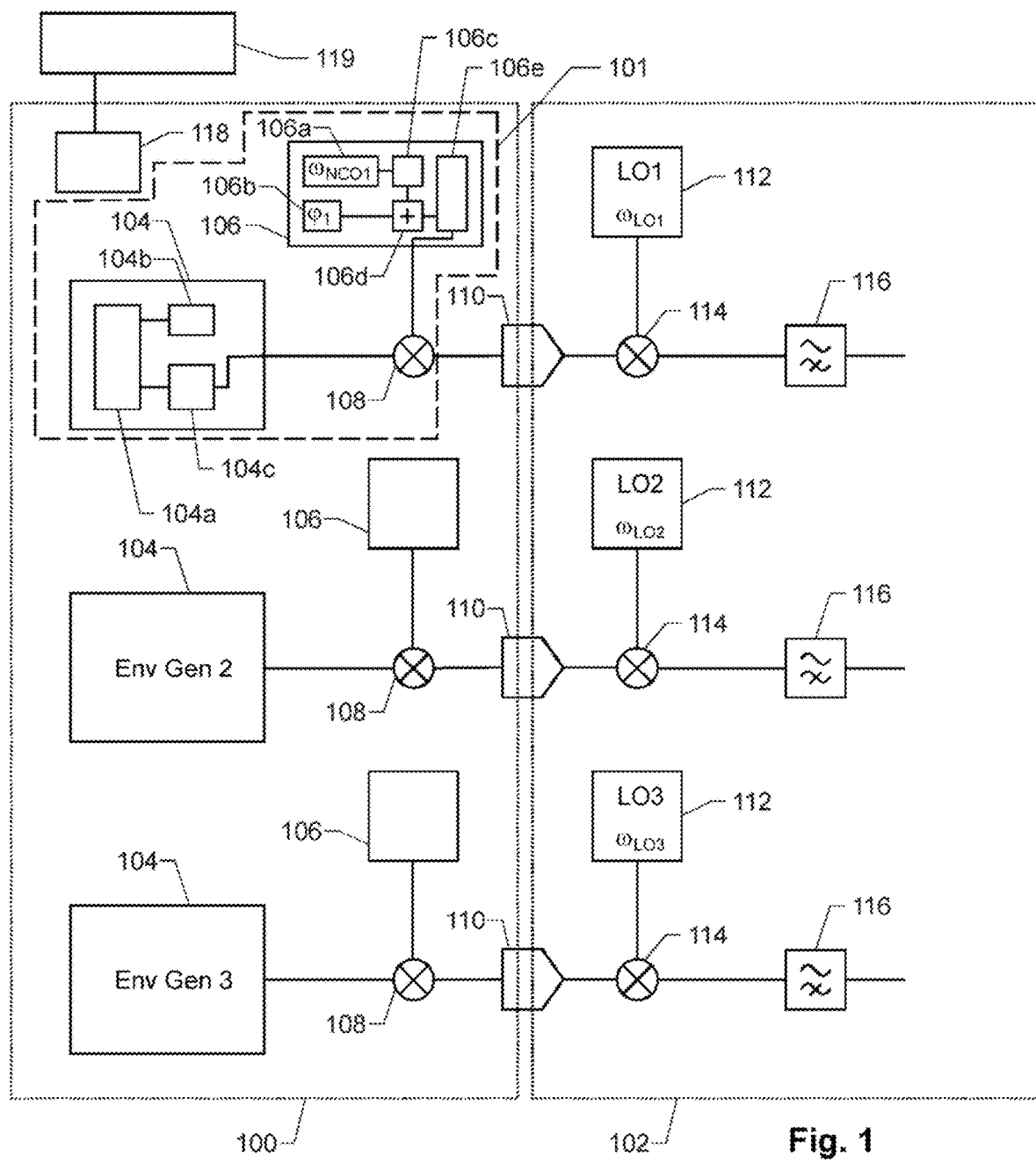
FIG. 1 is a schematic overview of signal generator.

FIG. 1 shows an overview of a signal generator having e.g. three output channels. It must be noted, though, that the number of output channels may only be two, or it may be larger than three.

The signal generator comprises a digital part 100 where signals are processed digitally, and an analog part 102, where analog signal processing takes place.

Each output channel comprises, as part of the digital part 100, a digital section 101. This digital section includes, in the present embodiment, a numerical signal envelope generator 104, a numerically-controlled oscillator (NCO) 106, and a digital multiplier 108. The signal from multiplier 108 is fed to a digital-analog converter (DAC) 110.

Each NCO 106 may e.g. comprise, as shown for one of the NCOs in FIG. 1, a register 106a for specifying its frequency $\omega_{NCOk}$ and a register 106b for specifying its phase. The frequency is used to operate a cycling counter 106c, whose value is added to the phase in an adder 106d. The output of adder 106d is used to address a lookup table 106e of sine values. Various other designs of NCOs are known to the skilled person.

Each numerical envelope generator 104 may, as shown for one of the envelope generators 104 in FIG. 1, e.g. comprise a waveform memory 104a for storing a time-series of values to be fed to its output. An address generator 104b is provided for sequentially reading out the values in waveform memory 104a. The read values may optionally be further processed in a scaler 104c or other processing circuitry and fed to the output of numerical envelope generator 104.

In the analog part 102, each output channel comprises a local oscillator 112 and a frequency mixer (i.e. multiplier) 114. It may also comprise a filter 116. In the following, it is assumed that the local oscillator is an analog oscillator 112 even though it may also include digital components.

The multiplier 114 forms part of a mixer and multiplies the signals from analog oscillator 112 and digital-analog converter 110.

The signal generator further comprises a sequencer control unit 118 controlling its components.

Further, the system may comprise a control computer 119 for preparing the instructions to be carried out by sequencer control unit 118 in real-time.

In particular, sequencer control unit 118 can be programmed to set, in real time, at least the following operating parameters of the signal generator:

The frequencies and phases of the NCOs 106, e.g. by setting the values in the registers 106a, 106b.

The values generated by the numerical envelope generator 104, e.g. by setting or selecting the values in waveform memory 104a, controlling address generator 104b, and/or setting the parameters of scaler 104c.

Figure 2:
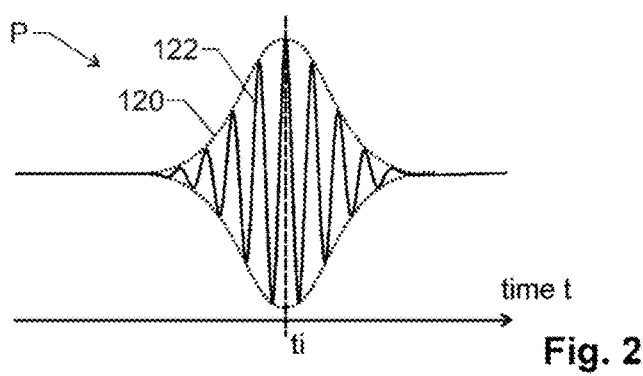
FIG. 2 shows a single pulse after up-conversion generated at one channel of the signal generator.

In operation, sequencer control unit 118 generates, with each channel, a series of pulses P, each of which has an envelope 120 modulated onto a carrier 122 as generally illustrated in FIG. 2.

Envelope 120 is generated by envelope generator 104. The carrier 122 is generated by mixing the frequencies of numerical oscillator 106 and analog oscillator 112.

The pulses P are generated at times $t_i$.

To generate a pulse, sequencer control unit 118 sets the frequency and phase of NCO 106 to $\varphi_k$ and $\omega_{NCOk}$, with k designating the channel, and generates an envelope signal $E(t-t_i)$ by means of envelope generator 104.

Multiplier 108 multiplies the envelope signal and the digital oscillator signal, thereby generating a digital signal at frequency $\omega_{NCOk}$ that encodes the phase $\varphi_k$. The "digital signal set" mentioned above includes, in this case, only this one digital signal.

Assuming that the analog oscillator 112 of the channel has a frequency $\omega_{LOk}$, the up-converted signal $S_k$ after frequency mixer 114 is given by $$S_k(t) = E(t - t_i) \cdot \sin(\omega_{NCOk} \cdot t + \varphi_k) \cdot \sin(\omega_{LOk} \cdot t) \quad (1)$$

$$= E(t - t_i)/2 \cdot ($$

$$\cos((\omega_{LOk} - \omega_{NCOk}) \cdot t - \varphi_k) - \cos((\omega_{LOk} + \omega_{NCOk}) \cdot t + \varphi_k))$$

In the following, it is assumed that we filter one of the frequency components after up-conversion by means of filter 116 or that the quantum processor or other circuitry driven by the signal generator does not generate a significant response to this frequency component. In the following, we assume that the lower frequency $\omega_{LOk} - \omega_{NCOk}$ can be ignored. (Note: if it is the higher frequency, $\omega_{LOk} + \omega_{NCOk}$, that is ignored, the frequency of NCO 106 can be written as a negative number in the equations of the description and claims, i.e. the invention is not limited to only one of the two variants.)

Hence, and ignoring the scaling factor and absorbing the negative sign into the envelope, Eq. (1) can be written as:

$$S_k(t) = E(t - t_i) \cdot \cos((\omega_{NCOk} + \omega_{LOk}) \cdot t + \varphi_k) \quad (2)$$

(Note: The overall negative sign of the sideband corresponds to a 180 deg phase shift that we absorb into the envelope E. We follow the convention of Eq. (2) in the remainder of the text.)

In other words, the frequency of carrier 112 is given by $\omega_{NCOk} + \omega_{LOk}$, and its phase $\delta$ can be directly controlled by phase $\varphi_k$ of NCO 106.

In operation, sequencer control unit 118 generates, in each of at least two of its channels k, a signal of such pulses at different times $t_i$ for different carrier frequencies $\omega_{NCOk} + \omega_{LOk}$.

Figure 3:
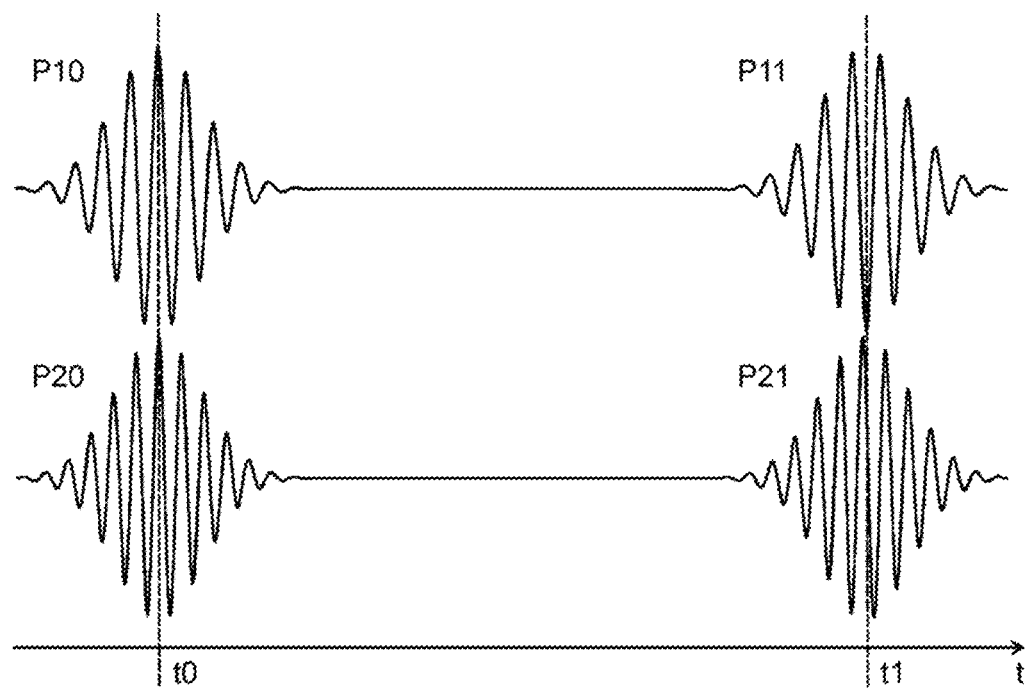
FIG. 3 shows two pulses after up-conversion with two different carrier frequencies without phase correction (not claimed)

FIG. 3 shows an example of pules P10, P11 after up-conversion for channel k'=1 and P20, P21 for channel k"=2 at times $t_0$ and $t_1$ assuming that the phases $\varphi_{k'}$ and $\varphi_{k''}$ of the two NCOs 112 remain unchanged between $t_0$ and $t_1$.

The times $t_0$ and $t_1$ are arbitrary and assumed not to be commensurate with the frequencies $\omega_{NCOk} + \omega_{LOk}$ of the carriers.

Hence, for a given channel, the actual shape of the pulses at times $t_0$ and $t_i$ are different. For example, as can be seen from FIG. 3, Pulse P10 may have a signal maximum at time $t_0$ (i.e. in the center of pulse P10), while the signal of pulse P11 is close to a minimum at time $t_1$ (i.e. at the center of pulse P11). Similarly, pulse P20 may also have a maximum at time $t_0$ while pulse P21 may have a value between its maximum and its minimum at time $t_1$.

In addition, the relative phases of the carriers of the two channel signals are different at times $t_0$ and $t_1$. In the example of FIG. 3, the signal values of both channels have e.g. a maximum at time $t_0$. At time $t_1$, however, the signal of the upper channel is close to a minimum while the signal of the lower channel is between its maximum and its minimum.

This kind of situation is undesired for a large number of applications, in particular in certain quantum computing and quantum simulation applications. In particular, for algorithms employing SWAP-type gates, such as iSWAP, sqrt (iSWAP), or fSim gates, it is ideally desired to generate exactly the same pulses with the same mutual phases at both times $t_0$ and $t_1$. Prominent applications are variational quantum algorithms, quantum chemistry simulations, and algorithms making use of qubit mapping.

Figure 4:
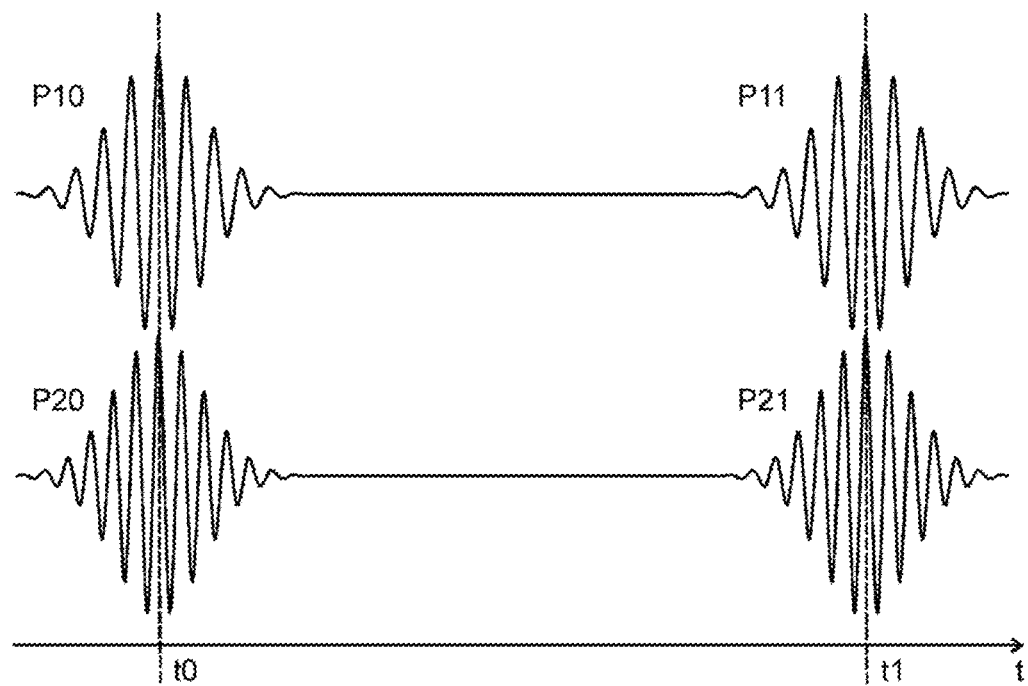
FIG. 4 shows a set of fully-corrected pulses after up-conversion.

This "ideal" situation is depicted in FIG. 4, where pulse P10 is identical to pulse P11 and pulse P20 is identical to pulse P21. In addition, and even more importantly, at times $t_0$ and $t_1$, the phase shift between the carriers of both channels is identical.

A situation as shown in FIG. 4 may be achieved by making the times $t_0$ and $t_1$ commensurate with the frequencies $\omega_1$ and $\omega_2$ of the carriers, e.g. if the following two conditions are met for integer numbers $N_1$ and $N_2$ $$t_1 - t_0 = 2\pi N_1/\omega_1 \text{ and } t_1 - t_0 = 2\pi N_2/\omega_2 \qquad (3)$$

Fulfilling the conditions (3), however, imposes a restriction on the possible values of $t_1-t_0$, i.e. the times $t_{01}$ and $t_0$ cannot be arbitrary anymore.

Fulfilling the requirement of commensurability becomes even harder when more than two channels are used, i.e. when more conditions are added to the system of Eq. (3).

Hence, sequencer control unit 118 may be adapted to solve the problem in a different manner.

In particular, sequencer control unit 118 may be adapted to change the phase $\varphi_k$ of one or more of the NCOs 112 between the times $t_0$ and $t_1$. Hence, instead of a fixed phase $\varphi_k$, a variable phase $\varphi_{ki}$ is used, i.e. different phases are used in channel k for the pulses at the times $t_i$.

In this case, Eq. (2) can be written, for a pulse at $t_i$, as $$S_k(t) = E(t - t_i) \cdot \cos((\omega_{NCOk} + \omega_{LOk}) \cdot t + \varphi_{ki}) \qquad (4)$$

The phase $\delta_{ki}$ of the carrier of channel k at time $t_i$ is $$\delta_{ki} = ((\omega_{NCOk} + \omega_{LOk}) \cdot t_i + \varphi_{ki}) \bmod 2\pi \qquad (5)$$

Hence, for each channel k, the phase difference $\Delta\delta_k = \delta_{k1} - \delta_{k0}$ between the carrier at times $t_0$ and $t_1$ is given by $$\Delta\delta_k = ((\omega_{NCOk} + \omega_{LOk}) \cdot (t_1 - t_0) + \varphi_{k1} - \varphi_{k0}) \bmod 2\pi. \qquad (6)$$

In the example of FIG. 4, the phase difference $\Delta\delta_k$ is zero for all channels k, i.e. $\Delta\delta_k=0$ for each individual k and therefore $$(\varphi_{k0} - \varphi_{k1}) \bmod 2\pi = ((\omega_{NCOk} + \omega_{LOk}) \cdot (t_1 - t_0)) \bmod 2\pi. \qquad (7)$$

For example, if $\varphi_{k0}$ may be set to be zero for all channels k, in which case we have $$\varphi_{k1} = -((\omega_{NCOk} + \omega_{LOk}) \cdot (t_1 - t_0)) \bmod 2\pi. \qquad (8)$$

Generalized Phase Shifts

In the embodiment of FIG. 4, the pulses P10 and P11 of the upper channel are identical, and so are the pulses P20 and P21 in the lower channel. Each carrier has the same phase at times $t_0$ and $t_1$.

In some applications, though, there is no need for each carrier to have the same phase at time $t_0$ and $t_1$. Rather, the only thing that matters is that the phase difference between the carriers of the different channels at time $t_0$ is equal to the phase difference between the carriers of the different channels at time $t_1$.

In other words, if we look at two channels k' and k", the phase differences $\Delta\delta_{k'}$ and $\Delta\delta_{k''}$ incurred between times $t_0$ and $t_1$ must be equal to each other. Hence, using Eq. 6)

$$((\omega_{NCOk'} + \omega_{LOk'}) \cdot (t_1 - t_0) + \varphi_{k'1} - \varphi_{k'0}) \bmod 2\pi = \qquad (9)$$
$$((\omega_{NCOk''} + \omega_{LOk''}) \cdot (t_1 - t_0) + \varphi_{k''1} - \varphi_{k''0}) \bmod 2\pi$$

Eq. (9) yields the following condition that need to be fulfilled for the phases $\varphi_{k'0}$ and $\varphi_{k'1}$ of channel k' at times $t_0$ and $t_1$ and the phases $\varphi_{k''0}$ and $\varphi_{k''1}$ of channel k" at times $t_0$ and $t_1$ $$(\varphi_{k''1} - \varphi_{k''0} - \varphi_{k'1} + \varphi_{k'0}) \bmod 2\pi = \qquad (10)$$
$$((\omega_{NCOk'} + \omega_{LOk'} - \omega_{NCOk''} + \omega_{LOk''}) \cdot (t_1 - t_0)) \bmod 2\pi$$

Figure 5:
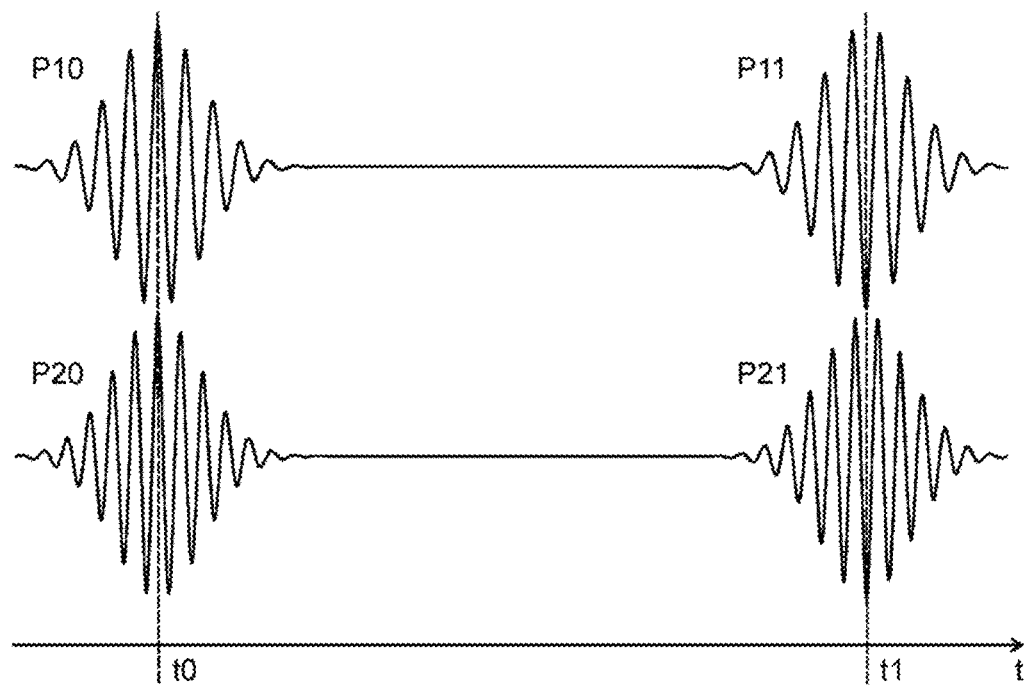
FIG. 5 shows a set of pulses after up-conversion where the carriers are phase-synchronized with each other at the times $t_0$ and $t_1$.

This situation is illustrated in FIG. 5. As can be seen, the signal of each channel has different values at the times $t_0$ and $t_1$, but the mutual phase shift between the carriers of the two channels at $t_0$ is the same as the mutual phase shift between the carriers of the two channels at $t_1$. In the shown embodiment, the phase shift between them is 0 at $t_0$ as well as at $t_1$, with both signals being e.g. at their maximum value at $t_0$ and at their minimum value at $t_1$.

Advantageously, the phase shift $\varphi_{ki}$ of at least one channel, e.g. channel k' is not changed between times $t_0$ and $t_1$, i.e. $\varphi_{k'1} - \varphi_{k'0} = 0$, e.g. for keeping it synchronized with a qubit that has not decayed nor been reset between the two times. In this case, the phase shift $\varphi_{k''i}$ of the NCO of the second channel k" must change between times $t_0$ and $t_1$ by $$(\varphi_{k''1} - \varphi_{k''0}) \bmod 2\pi = \qquad (11)$$
$$((\omega_{NCOk'} + \omega_{LOk'} - \omega_{NCOk''} - \omega_{LOk''}) \cdot (t_1 - t_0)) \bmod 2\pi$$

This case is depicted in FIG. 5.

It must be noted, though, that the phase shift in both channels k' and k" may be changed between times $t_0$ and $t_1$ as long as the condition of Eq. (10) is fulfilled, i.e. the condition of Eq. (10) is broader than the condition of Eq. (11).

The criterion of Eq. (10) is the most general condition that maintains that the carriers of both channels have the same mutual phase shift at the times $t_0$ and $t_1$. The case of FIG. 4 (which corresponds to Eq. (7) being fulfilled for all channels k) and FIG. 5 (which corresponds to Eq. (11) being fulfilled) both meet the criterion of Eq. (10), but, in general, the criterions of Eq. (7) and Eq. (11) are mutually exclusive if times $t_0$ and $t_1$ are arbitrary and not commensurate with the frequencies.

Phase Calibration Procedure

The above conditions allow to generate synchronized pules at times $t_0$ and $t_1$ as long as the analog oscillators 112 run uninterrupted between the times to and $t_1$, e.g. they are e.g. not reset between $t_0$ and $t_1$ and there is no appreciable phase shift.

However, in order to always have exactly the same pulse at the outset, e.g. after switching on the signal generator, at time $t_0$, the phase of at least one analog oscillator 112, in particular the phases of all the analog oscillators, is/are monitored by sequencer control unit 118 (or they may be reset before to). Such monitoring, when e.g. carried out close to the qubit, in particular by a measurement on the qubit, also allows to compensate for cable length.

If, for example, it is desired to have the carrier of channel k at time $t_0$ to have a given phase value $\delta_{k0}$ but the monitoring measurement of the analog oscillator shows that it will, without correction, have an effective value $\delta'_{k0}$, the phase value $\varphi_{k0}$ of NCO 106 can be corrected by $\delta'_k - \delta_{k0}$.

Pulse Envelopes

In the embodiments of FIGS. 4 and 5, the envelopes of the pulses are identical for both channels and for both times $t_0$ and $t_1$, i.e. the pulses P10, P11, P20, P21 all have the same shape. In other words, as in Eq. (4), the envelope of all pulses can be described by the same function $E(t-t_i)$.

Depending on the application, though, the envelope may be different for the individual times $t_i$ for a single channel k and/or it may be different for the different channels k even for the same time $t_i$. Hence, in general, the envelope may depend on pulse time $t_i$ and/or channel k. Therefore, in a more general form, Eq. (4) can be written, for a given pulse at time $t_1$ and for channel k as $$S_k(t) = E_{k,i}(t - t_i) \cdot \cos((\omega_{NCOk} + \omega_{LOk}) \cdot t + \varphi_{ki}), \quad (12)$$

with $$E_{k',i'}(t - t_{i'}) \neq E_{k'',i''}(t - t_{i''}) \quad (13)$$

for at least some of the k'≠k" and/or i'≠i".

Advantageously, though, the pulses of one channel k at the times $t_0$ and $t_1$ have the same envelope, i.e.

$$E_{k,0}(t - t_0) = E_{k,1}(t - t_1) \quad (14)$$

for k=k' and k=k". This, in combination with the condition of Eq. (7), yields two identical pulses at the times $t_0$ and $t_1$ as shown for each channel in the embodiment of FIG. 4.

In the embodiments of FIGS. 4 and 5, all pulses have the same envelope. In this case, in addition to the condition (14), the following condition is met:

$$E_{k',0}(t - t_{i'}) = E_{k'',1}(t - t_i) \quad (15)$$

for all combinations of i, i'=0, 1.

Even though substantially Gaussian envelopes have been shown in all embodiments, other envelopes may be used as well, such as rectangular envelopes, exponentially decaying envelopes, or other envelopes.

Single-Sided Up-Conversion

Figure 6:
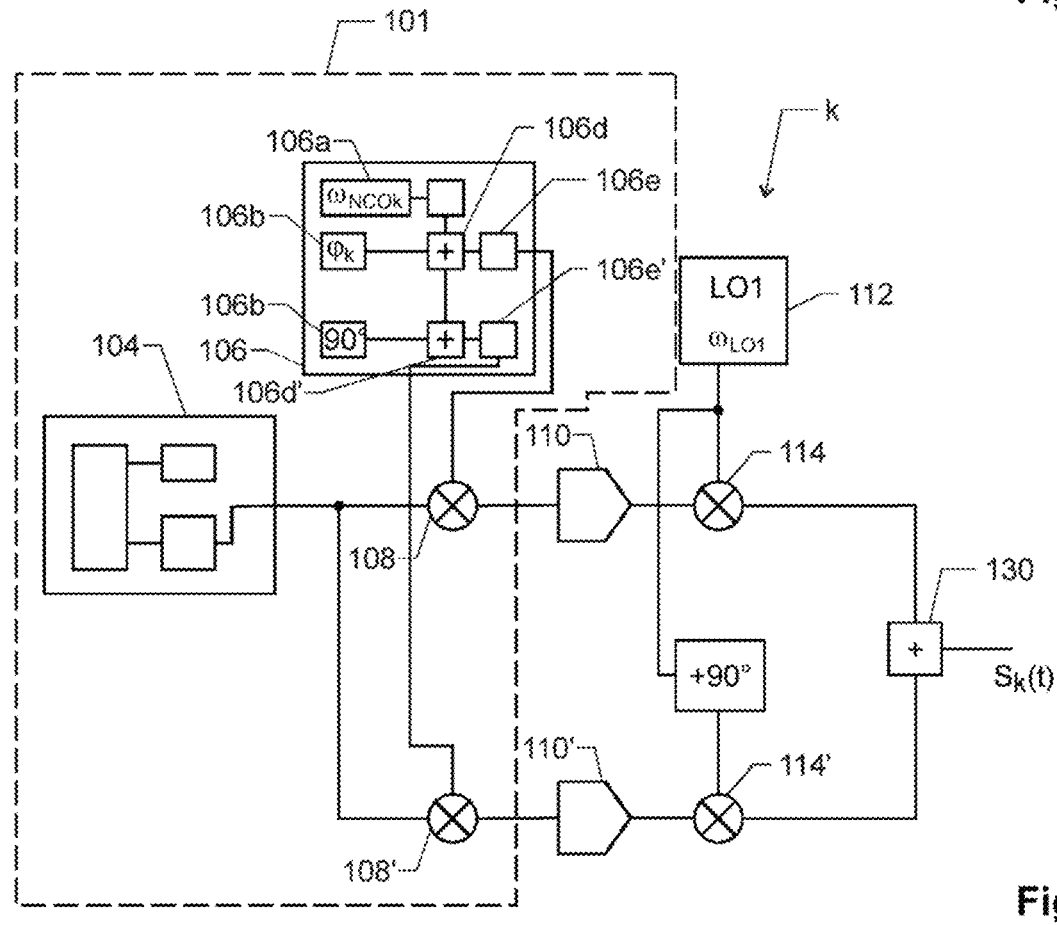
FIG. 6 shows a single channel of a second embodiment of a signal generator.

FIG. 6 shows an embodiment of how to implement a channel k of a signal generator using single-sided up-conversion, which obviates the need for filter 116.

In this embodiment, the shown channel comprises, in its digital section 101, an NCO 106 that is able to generate two output signals phase-shifted by advantageously 90° (even though the phase shift may be different from 90° as long as it is not an integer multiple of) 180°. In the shown embodiment, this is implemented by providing a second adder 106d' adding an additional 90° phase shift to $\varphi_1$ and a second lookup table 106e'. Alternatively, a lookup table 106e tabulating non-shifted and 90°-shifted values can be used.

The two 90° phase-shifted NCO signals are fed to a first digital multiplier 108 and a second digital multiplier 108', respectively, each of which multiplies the respective signal from NCO 106 with the value from numerical envelope generator 104. The output values of the digital multipliers 108, 108' form the digital signals generated by digital section 101. Together, they form the digital signal set mentioned above. They are both at frequency $\omega_{NCOk}$ and they encode the phase shift $\varphi_k$ by each of them directly being shifted (in respect to e.g. to or $t_1$) by this phase shift. They are mutually phase-shifted by 90°.

The digital signals are fed to separate first and second DACs 110, 110' in order to generate two 90° phase-shifted analog signals at the frequency of NCO 106. These analog signals together form the analog signal set mentioned above.

In the analog part, the channel comprises a first analog multiplier 114 and a second analog multiplier 114'. The signal from analog oscillator 112 is fed, together with the signal from first DAC 110, to the first analog multiplier 114. A 90° phase-shifted version of the signal from analog oscillator 112 is fed, together with the signal from second DAC 110', to the second analog multiplier 114'. The output signals of the two analog multipliers 114, 114' are subsequently added in an analog adder 130.

Analog oscillator 112, the multipliers 114, 114', and adder 130 together form an up-converter. The multipliers 114, 114' form part of a mixer adapted to generate an up-converted signal.

As known to the skilled person, this design inherently suppresses one of the two high-frequency sidebands in the up-converted signal and obviates the need for a steep, expensive filter.

IQ Up-Conversion

Figure 7:
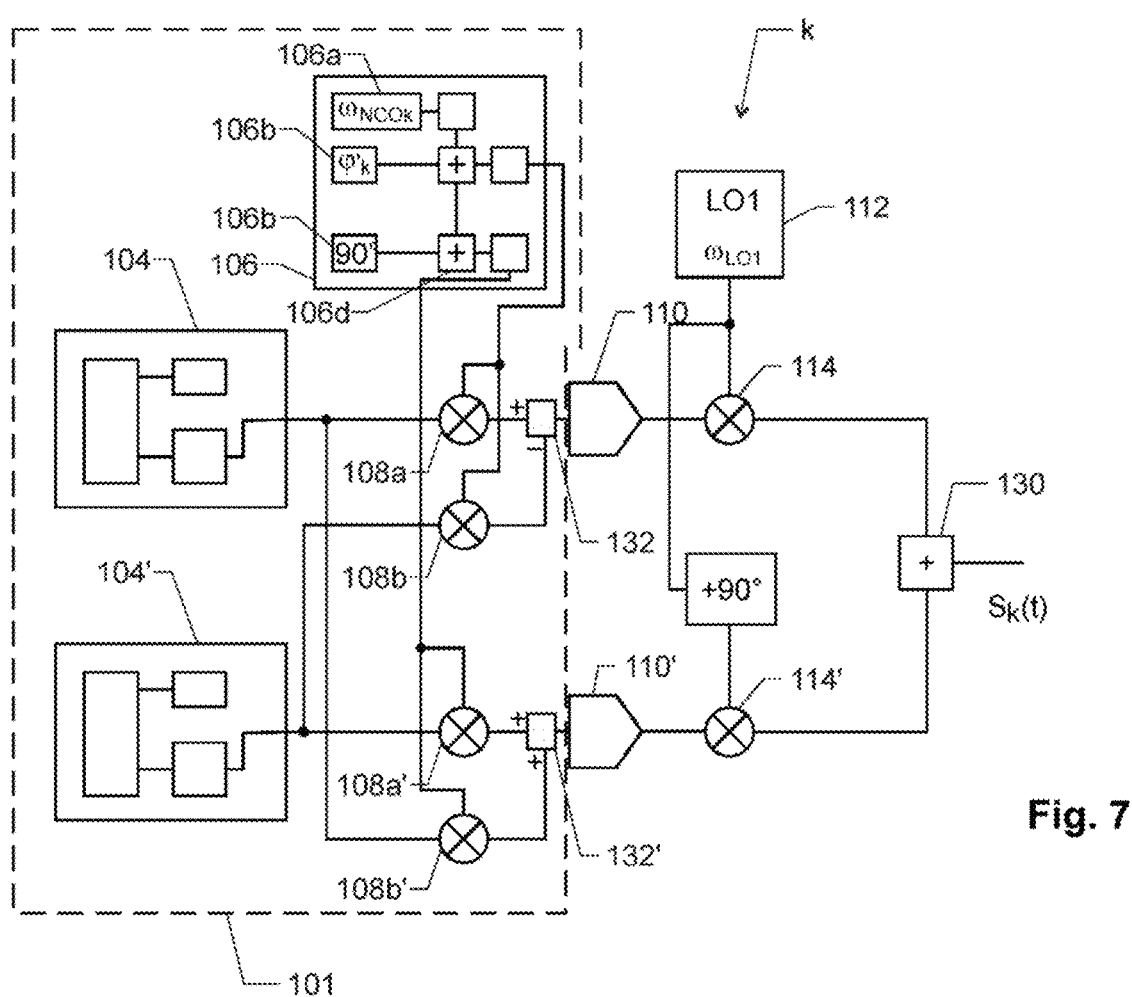
FIG. 7 shows a single channel of a third embodiment of a signal generator.

FIG. 7 shows an embodiment of implementing a channel k of a signal generator using IQ up-conversion.

In this embodiment, the phase shift that can be applied to NCO 106 is called $\varphi'_{ki}$ for reasons that will become apparent below.

It differs from the embodiment of FIG. 6 in that it comprises, in its digital section 101, a first and a second numerical envelope generator 104, 104' and four digital multipliers 108*a*, 108*b*, 108*a*', 108*b*'. The first two multipliers 108*a*, 108*b* multiply the two signals from the envelope generators 104, 104' with the non-phase-shifted digital oscillator signal from NCO 106, and the second two multipliers 108*a*', 108*b*' multiply the two signals from the envelope generators 104, 104' with the 90°-shifted digital oscillator signal from NCO 106. The outputs of the first two multipliers 108*a*, 108*b* are subtracted in a subtractor 132 before being fed to first DAC 110, and the outputs of the second two multipliers 108*a*', 108*b*' are added in an adder 132' before being fed to second DAC 110'.

The two digital signals generated by the adder and subtractor 132', 132 together form the digital signal set mentioned above.

The two analog signals generated by the DACs 110, 110' together form the analog signal set mentioned above As known to the skilled person, this design again suppresses one of the two high-frequency sidebands. (In the present embodiment, the upper sideband is suppressed.) In addition, the phase of the analog high-frequency signal at the output of the channel can be controlled, e.g. during the pulse or between pulses, by varying the ratio of the signals from the envelope generators 104, 104'.

In the following we assume that the envelope generators 104, 104' generate signals $E_I$ and $E_Q$ at their outputs that can be written as follows:

$$E_I(t - t_i) = E(t - t_i) \cdot \cos(\varepsilon_k) \text{ and} \quad (16)$$

$$E_Q(t - t_i) = E(t - t_i) \cdot \sin(\varepsilon_k),$$

In this case, and assuming E(t) to be real-valued, the signal $S_k(t)$ at the output of the channel k shown in FIG. 7 is given by $$S_k(t) = E(t - t_i) \cdot \cos((\omega_{LOk} - \omega_{NCOk}) \cdot t - \varphi_{ki}) \quad (17)$$

with $$\varphi_{ki} = \varphi'_{ki} + \varepsilon_k \quad (18)$$

In other words, if the envelope generators 104, 104' generate signals as that can be expressed as in Eq. (16), the signal $S_k(t)$ at the output of the channel k is the up-modulated signal, in this embodiment of the lower sideband. The phase shift $\varphi_{ki}$ of the up-converted signal is given by the sum of the NCO phase shift $\varphi'_{ki}$ and the value $\varepsilon_k$ of Eq. (16).

Hence, in this embodiment, the phase shift $\varphi_{ki}$ can be encoded in two different ways:

A) The phase shift $\varphi_{ki}$ may be set using the phase shift $\varphi'_{ki}$ of the NCO. In this case, both digital signals of the digital signal set may encode the phase shift by being directly phase-shifted by $\varphi'_{ki} = \varphi_{ki}$.

B) The phase shift $\varphi_{ki}$ may be set by the parameter $\varepsilon_k$. In this case, the digital signals of the digital signal set encodes the phase shift in the ratio of their amplitudes.

Variants A and B may be combined, in which case the final phase shift will be given by the sum of Eq. (18).

If only variant B is used, NCO 106 does not need to have an adjustable phase shift.

In yet another embodiment, NCO 106 can be dispensed completely if the complete two digital signals are e.g. directly generated by the envelope generators 104, 104', e.g. using a lookup table of a time series of signal values.

In the above, the envelope generators are assumed to generate signals fulfilling Eq. (16). In more general terms, we can allow E(t) to be a complex signal with, $$E_I(t - t_i) = \text{Re}(E(t - t_i)) \text{ and} \quad (16')$$

$$E_Q(t - t_i) = \text{Im}(E(t - t_i)),$$

which ensures that one of the sidebands is fully suppressed after adder 130. If full sideband suppression is not required, however, conditions (16) or (16') need not be met. In that case, however, the phase shift $\varphi_{ki}$ can still be encoded in the relative amplitude of the two envelope signals, i.e. in the relative amplitude of the two digital signals of the digital signal set.

More than Two Channels

In the embodiments above, the signal generator had two channels k' and k". This concept can be expanded to three or more channels.

In this case, the condition of Eq. (10) must be met for any pair k' and k" of the three or more channels if, at the times $t_0$ and $t_1$, the carriers of all channels are to have a fixed phase relationship with each other. However, it can be shown readily that this is equivalent to the following condition being fulfilled for all channel k≠k':

$$(\varphi_{k1} - \varphi_{k0} - \varphi_{k'1} + \varphi_{k'0}) \text{mod} 2\pi = \quad (16)$$

$$((\omega_{NCOk'} + \omega_{LOk'} - \omega_{NCOk} - \omega_{LOk}) \cdot (t_1 - t_0)) \text{mod} 2\pi$$

Notes

Pulses of the type shown here may be used to operate on one or more qubits of a quantum processor. Typically, the pulses are grouped in shots, with each shot optionally comprising more than one pulse per channel. Within a shot, the qubit typically does not decay, but it typically does decay or is reset between shots.

The times $t_0$ and $t_1$ may lie in different shots or they may be times within a single shot.

Advantageously, though, the envelopes $E_{k,i}(t-t_i)$ (or E(t-$t_i$) in the case of equal pulse shapes) have a non-zero width much smaller than the distance $t_1-t_0$. In particular, the non-zero width of the envelopes is advantageously no more than $(t_1-t_0)/10$, in particular $(t_1-t_0)/1000$.

As explained, the phase $\varphi_k$ of NCO 106 of at least one of the channels has, in general, to be changed between the times $t_0$ and $t_1$. Advantageously, in order to have pulses with a single frequency only, the change of the phase $\varphi_k$ is carried out at a time t when the value from digital envelope generator (104) is zero, i.e. the values of the envelopes $E_{k,i}(t-t_i)$ for all i are zero.

Advantageously, for pulses in a single shot, $t_1-t_0$ lies between 10 ns and 100 μs. For pulses in different shot, $t_1-t_0$ is at advantageously least 10 μs. This is particularly true for superconducting qubits. For semiconductor-based qubits, $t_1-t_0$ is advantageously at least 100 ns.

The (angular) frequency $\omega_{LOk}$ of the analog oscillators 112 is advantageously at least 2π·2 GHZ, in particular at least 2π·4 GHz, for at least one channel, and in particular for at least the first and the second channel k' and k". For such frequencies, the invention is particularly advantageous because numerical oscillators at such frequencies are hard to implement with the required phase resolution.

The frequency $\omega_{NCOk}$ of the numerical oscillators 106 is advantageously less than $2\pi \cdot 500$ MHz, for at least one, and in particular for at least the first and the second channel k' and k". This allows for easy implementation in digital circuitry with large phase resolution.

The invention can be readily applied to more than two subsequent, in particular consecutive, pulses per channels, i.e. to pulses $t_i$ with $i=1 \ldots N$ and $N>0$. In this case, the conditions mentioned above must be met e.g. between subsequent pulses $t_{i'}$ and $t_{i''}$ with $i''>i'$.

The present techniques allow to re-establish the same phase condition at any time in the future without the need for resetting any of the analog oscillators or for the analog oscillators to have frequencies commensurate with the times of the pulses.

The experiment or gate can be started at any system clock cycle since the signals are independent of the phases of the analog oscillators. In fact, there is no strict need to know the current phase of the analog oscillators.

Note: The term "frequency" as used herein denotes "angular frequency".

Advantageously, the frequencies of the NCOs as well as of the LOs do not change between $t_0$ and $t_1$, i.e. they remain constant.

While there are shown and described presently preferred embodiments of the invention, it is to be distinctly understood that the invention is not limited thereto but may be otherwise variously embodied and practiced within the scope of the following claims.

The invention claimed is:

1. A method for generating at least two signals $S_k$ with $k=1 \ldots K$ by a signal generator, wherein the signal generator comprises at least a first channel k' and a second channel k", with each channel k having
   a digital section adapted to generate a digital signal set comprising at least one digital signal having a frequency $\omega_{NCOk}$, wherein the digital signal set encodes digital phase information indicative of a phase shift $\varphi_k$,
   at least one digital-analog converter adapted to convert the digital signal set into an analog signal set comprising at least one analog signal having a frequency $\omega_{NCOk}$, wherein the analog signal set encodes the information indicative of the phase shift $\varphi_k$,
   an up-converter comprising a local oscillator adapted to generate an analog oscillator signal at a frequency $\omega_{LOk}$ and a mixer adapted to generate an up-converted signal from the analog oscillator signal and the analog signal set, wherein the up-converted signal has a frequency of $\omega_{LOk}+\omega_{NCOk}$ with the phase shift $\varphi_k$,
   said method comprising:
   generating, at a time $t_0$, a first pulse with the first channel k' and a first pulse with the second channel k",
   generating, at a time $t_0$, a second pulse with the first channel k' and a second pulse with the second channel k",
   operating, during both times $t_0$ and $t_1$,
   the local oscillator of the first channel k' at a frequency $\omega_{LOk'}$,
   the local oscillator of the second channel k" at a frequency $\omega_{LOk''}$,
   the numerically controlled oscillator of the first channel at a frequency $\omega_{NCOk'}$,
   the numerically controlled oscillator of the second channel at a frequency $\omega_{NCOk''}$,
   operating the digital sections of both channels at the times $t_0$ and $t_1$ to generate pulse envelopes for the pulses,
   changing, between the times $t_0$ and $t_1$, at least one of
   the phase shift $\varphi_{k'}$ of the first channel and
   the phase shift $\varphi_{k''}$ of the second channel, while maintaining $$(\varphi_{k''1} - \varphi_{k''0} - \varphi_{k'1} + \varphi_{k'0}) \bmod 2\pi =$$
$$((\omega_{NCOk'} + \omega_{LOk'} - \omega_{NCOk''} - \omega_{LOk''}) \cdot (t_1 - t_0)) \bmod 2\pi,$$

with $\varphi_{k'0}$ and $\varphi_{k'1}$ being the phase shifts of the first channel at the times $t_0$ and $t_1$, respectively and $\varphi_{k''0}$ and or $\varphi_{k''1}$ being the phase shifts of the second channel at the times $t_0$ and $t_1$, respectively.

2. The method of claim 1, wherein, for each channel, the phase shifts fulfill $$(\varphi_{k0} - \varphi_{k1}) \bmod 2\pi = ((\omega_{NCOk} + \omega_{LOk}) \cdot (t_1 - t_0)) \bmod 2\pi,$$

for both k=k' and k=k".

3. The method of claim 1, wherein the phase shifts for the first channel k' fulfill $$\varphi_{k'1} - \varphi_{k'0} = 0,$$

and wherein the phase shifts for the second channel k" fulfill $$(\varphi_{k''1} - \varphi_{k''0}) \bmod 2\pi =$$
$$((\omega_{NCOk'} + \omega_{LOk'} - \omega_{NCOk''} - \omega_{LOk''}) \cdot (t_1 - t_0)) \bmod 2\pi.$$

4. The method of claim 1, wherein $t_1-t_0$ is between 10 ns and 100 µs.

5. The method of claim 1, wherein $t_1-t_0$ is at least 10 µs.

6. The method of claim 1, wherein the frequency $\omega_{LOk}$ is at least $2\pi \cdot 2$ GHZ for at least one channel.

7. The method of claim 1, wherein the frequency $\omega_{NCOk}$ is less than $2\pi \cdot 500$ MHz for at least one channel.

8. The method of claim 1, wherein the signal generator comprises at least three channels for which $$(\varphi_{k1} - \varphi_{k0} - \varphi_{k'1} + \varphi_{k'0}) \bmod 2\pi =$$
$$((\omega_{NCOk'} + \omega_{LOk'} - \omega_{NCOk} - \omega_{LOk}) \cdot (t_1 - t_0)) \bmod 2\pi$$

is fulfilled for any channel k≠k'.

9. The method of claim 1, wherein the phase shift $\varphi_k$ is changed for at least one channel k of the channels at a time t between the times $t_0$ and $t_1$ when a value from the digital envelope of said channel k is zero.

10. The method of claim 1, further comprising generating, for each pulse, an envelope $E_{k,i}(t-t_i)$, with k=k' and k", and with i=i' and i", wherein $$E_{k',i'}(t-t_{i'}) \neq E_{k'',i''}(t-t_{i''})$$

for at least some of the k'≠k" and/or i'≠i".

11. The method of claim 1, further comprising generating, for each pulse, an envelope $E_{k,i}(t-t_i)$, with k=k' and k" and with i=0 and 1, wherein $$E_{k,0}(t-t_0) = E_{k,1}(t-t_1)$$

for k=k' and for k=k".

12. The method of claim 1, further comprising generating, for each pulse, an envelope $E_{k,i}(t-t_i)$, with k=k' and k" and with i=0 and 1, wherein $$E_{k',0}(t-t_{i'}) = E_{k'',1}(t-t_i)$$

for all combinations i, i'=0, 1.

13. The method of claim 1, wherein the digital section comprises:
- a numerically controlled oscillator at the frequency $\omega_{NCOk}$
- at least one envelope generator generating a digital envelope signal,
- at least one digital multiplier connected to the envelope generator and the numerically controlled oscillator.

14. The method of claim 13 wherein the numerically controlled oscillator is adapted to generate the digital oscillator signal having the phase shift $\omega_k$.

15. The method of claim 1, wherein the digital section is adapted to generate, as part of the digital signal set, at least a first digital signal and a second digital signal, wherein the first and second digital signals are mutually phase-shifted.

16. The method of claim 15, further comprising setting a ratio of the amplitudes of the first and the second digital signal as a function of the phase shift $\varphi_k$.

17. The method of claim 15, wherein the first digital signal and a second digital signal have a mutual phase shift of 90°.

18. A signal generator for carrying out the method of claim 1, wherein the signal generator comprises:
at least a first channel k' and a second channel k", with each channel k having:
- a digital section adapted to generate a digital signal set comprising at least one digital signal having a frequency $\omega_{NCOk}$, wherein the digital signal set encodes digital phase information indicative of a phase shift $\varphi_k$,
- at least one digital-analog converter adapted to convert the digital signal set into an analog signal set comprising at least one analog signal having a frequency $\omega_{NCOk}$, wherein the analog signal set encodes the information indicative of the phase shift $\varphi_k$,
- an up-converter comprising a local oscillator adapted to generate an analog oscillator signal at a frequency $\omega_{LOk}$ and a mixer adapted to generate an up-converted signal from the analog oscillator signal and the analog signal set, wherein the up-converted signal has a frequency of $\omega_{LOk} \pm \omega_{NCOk}$ with the phase shift $\varphi_k$, and
- a sequencer control unit.

19. An application of the method of claim 1 for controlling at least one qubit.

20. The method of claim 1, further comprising:
operating, at any time between $t_0$ and $t_1$,
- the local oscillator of the first channel k' at a frequency $\omega_{LOk'}$,
- the local oscillator of the second channel k" at a frequency $\omega_{LOk''}$,
- the numerically controlled oscillator of the first channel at a frequency $\omega_{NCOk'}$, and
- the numerically controlled oscillator of the second channel at a frequency $\omega_{NCOk''}$.

21. The method of claim 1, wherein the frequency $\omega_{LOk}$ is at least 2π·2 GHz for at least the first and the second channel.

22. The method of claim 1, wherein the frequency $\omega_{NCOk}$ is less than 2π·500 MHz for at least the first and the second channel.

* * * * *